United States Patent
Behrendt et al.

(10) Patent No.: US 9,100,111 B2
(45) Date of Patent: Aug. 4, 2015

(54) MONITORING OF A HIGH-FREQUENCY TRANSMIT DEVICE OF A MAGNETIC RESONANCE TOMOGRAPHY SYSTEM

(71) Applicants: Olaf Behrendt, Nürnberg (DE); Pascal Mühlich, Bubenreuth (DE); Volker Schnetter, Nürnberg (DE); Christian Wünsch, Röthenbach a.d. Pegnitz (DE)

(72) Inventors: Olaf Behrendt, Nürnberg (DE); Pascal Mühlich, Bubenreuth (DE); Volker Schnetter, Nürnberg (DE); Christian Wünsch, Röthenbach a.d. Pegnitz (DE)

(73) Assignee: Siemens Aktiengesellschaft, München (DE)

( * ) Notice: Subject to any disclaimer, the term of this patent is extended or adjusted under 35 U.S.C. 154(b) by 95 days.

(21) Appl. No.: 14/057,793

(22) Filed: Oct. 18, 2013

(65) Prior Publication Data
US 2014/0113577 A1    Apr. 24, 2014

(30) Foreign Application Priority Data
Oct. 18, 2012  (DE) .......................... 10 2012 219 025

(51) Int. Cl.
*A61B 5/05* (2006.01)
*H04B 17/00* (2015.01)
*H04B 17/10* (2015.01)

(52) U.S. Cl.
CPC ............ *H04B 17/003* (2013.01); *H04B 17/101* (2015.01)

(58) Field of Classification Search
CPC ................................ A61B 5/055; G01R 33/20
USPC ......... 455/67.11, 67.16, 115.1; 324/307, 313, 324/322, 318, 342; 600/410
See application file for complete search history.

(56) References Cited

U.S. PATENT DOCUMENTS

| | | | |
|---|---|---|---|
| 7,511,492 B2 * | 3/2009 | Sodickson et al. ............ | 324/309 |
| 8,244,192 B2 * | 8/2012 | Prasidh et al. ................ | 455/110 |
| 8,643,364 B2 * | 2/2014 | Umeda et al. ................. | 324/309 |
| 2007/0273377 A1 | 11/2007 | Yang et al. | |
| 2010/0167668 A1 | 7/2010 | Nistler et al. | |
| 2012/0153951 A1 * | 6/2012 | Kozlov et al. ................ | 324/313 |

FOREIGN PATENT DOCUMENTS

DE    102008063630    8/2010

OTHER PUBLICATIONS

German Office Action cited in German Application No. 10 2012 219 025.2, mailed Apr. 15, 2013, with English Translation.

* cited by examiner

*Primary Examiner* — Sonny Trinh
(74) *Attorney, Agent, or Firm* — Lempia Summerfield Katz LLC

(57) ABSTRACT

A method for monitoring a high-frequency transmit device of a magnetic resonance tomography system with a transmit antenna system having a plurality of transmit channels is provided. A reference transmit signal is output on different transmit channels of the transmit antenna system, respectively, at different time points, and a reference measurement signal induced by the reference transmit signal is measured on at least one of the other transmit channels using a measuring device assigned to the transmit channel. Based on the reference measurement signal, a phase deviation indicator value is determined. The phase deviation indicator value indicates a relative phase deviation between the measuring devices of the transmit channels in question.

20 Claims, 2 Drawing Sheets

MONITORING OF A HIGH-FREQUENCY TRANSMIT DEVICE OF A MAGNETIC RESONANCE TOMOGRAPHY SYSTEM

This application claims the benefit of DE 10 2012 219 025.2, filed on Oct. 18, 2012, which is hereby incorporated by reference in its entirety.

BACKGROUND

The present embodiments relate to monitoring a high-frequency transmit device of a magnetic resonance tomography system with a transmit antenna system having a plurality of transmit channels.

The imaging of an examination object, referred to in the following as a patient, using a magnetic resonance tomography system operates essentially in three steps: First, in the region of a body region to be imaged, a powerful, stable, homogeneous magnetic field (e.g., a $B_0$ field) and therefore a stable alignment of the magnetization of protons (e.g., proton spin) is generated in the body region in question. This stable alignment is changed by supplying electromagnetic high-frequency energy (e.g., emitting high-frequency pulses (the $B_1$ field)). This energy stimulation is terminated again, and the nuclear resonance signals produced in the body are measured with the aid of suitable receive coils in order thus to obtain information about the tissue in the body region. A magnetic resonance tomography system, therefore, includes a plurality of interacting components. Each interacting component of the plurality of interacting components uses modern and complex technologies. A central element of a magnetic resonance tomography system is the high-frequency transmit device that is responsible, for example, for generating the high-frequency pulses to be radiated into a body region. The high-frequency pulses emitted by a high-frequency power amplifier of the high-frequency transmit device are conducted in this process to a transmit antenna system, with which the high-frequency pulses are radiated into a body region.

As magnetic resonance tomography systems have been developed and become established, limit values regulating the maximum high-frequency radiation into a human body have been set to provide patient safety. A typical limit value for this is the maximum permissible specific absorption rate (SAR) value. For example, the whole body SAR that the power absorbed by the patient in a time window averaged over 6 minutes is not to exceed a value of 4 W/kg. Measuring devices that may be used to measure the high-frequency power are provided in the magnetic resonance systems. Directional couplers may be used in the supply lines to the antenna system for this purpose. These decouple signals that may represent the power of the emitted high-frequency pulses in the form of voltage values. The measured values may be processed to obtain suitable control values therefrom. If these control values exceed limit values, the function of the high-frequency transmit device may be restricted. For example, the emitted power may be reduced, a measurement may be aborted completely, or other measures may be taken so that patient safety may be provided when there is any doubt.

Most magnetic resonance tomography systems currently available on the market contain just one transmit channel. The amplitude accuracy and temporal stability of the measuring devices used for the abovementioned monitoring of the outward HF pulses are already provided by an extensive design concept. In the meantime, however, an increasing number of magnetic resonance tomography systems with multichannel transmit architectures have come into use. In such transmit antenna systems with a plurality of transmit channels, high-frequency pulses may be emitted via the individual transmit channels independently of one another, overlying one another after emission and thus generating a precisely defined $B_1$ field. The generation of the $B_1$ field magnetization is, for example, based on the correct addition of the pulse sequences generated by the individual transmit channels. The $B_1$ field distribution is therefore no longer just a function of the amplitudes of the pulses on the individual channels but also of their relative phases.

In DE 10 2008 063 630 B4, therefore, a method is described for monitoring a high-frequency transmit device of a magnetic resonance tomography system, in which the high-frequency voltage amplitudes on the individual transmit channels are regularly determined, and the control values are respectively formed, taking into account a scatter parameter matrix of the transmit antenna system. The function of the high-frequency transmit device is restricted if such a control value reaches or exceeds a predetermined limit control value. In principle, this method functions very well. It is to be provided that the individual components of the system (e.g., the measuring devices of the transmit channels in question) operate correctly. Not only are the amplitudes to be measured with absolute accuracy, but also, any phase displacements between the individual measuring devices assigned to the transmit channels are to be known correctly and do not change. Extensive calibration routines may be performed, or the measuring device or the components associated therewith may either be checked by a service engineer or may even be replaced and submitted to a factory calibration in a defined cycle.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a way of checking the measuring devices used for monitoring a high-frequency transmit device of a magnetic resonance tomography system, with which relative phases of the measuring devices assigned to individual transmit channels may be checked in relation to one another without major outlay, is provided.

With one embodiment of a method, a reference transmit signal is output one after the other on different transmit channels of the transmit antenna system, respectively, at different time points, and a reference measurement signal induced by the reference transmit signal is measured, respectively, on at least one of the other transmit channels using a measuring device assigned, respectively, to the transmit channel. The measuring device includes, for example, directional coupler. A reference measurement signal may also be detected when outputting the reference transmit signal with the aid of a measuring device that is assigned to the outputting transmit channel. A phase deviation indicator value is determined based on the reference measurement signals. The phase deviation indicator value indicates a relative phase deviation between the respective measuring devices of the transmit channels in question.

This phase deviation indicator value may be an absolute value of a defined variable (e.g., a time offset or a phase angle). In the simplest instance, however, the phase deviation indicator value may also just be a Boolean value (e.g., a 0 or 1 or "yes" or "no"), which shows whether or not a relevant or significant phase deviation, for example, is present. The reference transmit signal may be any signal. The reference transmit signal is to be able to induce an adequate reference measurement signal on the other transmit channels, respectively, as well. An identical reference transmit signal may be emitted, respectively, on each of the transmit channels with corresponding temporal offset.

With this method, a relative phase deviation of two measuring devices may be determined in relation to one another at any time in a simple manner, so that suitable measures for maintaining patient safety may be instituted as part of the further monitoring method (e.g., aborting a measurement or the like). Different options for this are described in more detail below.

In one embodiment, a high-frequency monitoring device for performing such a method, which may be used within a magnetic resonance tomography system for such a high-frequency transmit device with a transmit antenna system having a plurality of transmit channels, is provided.

The high-frequency monitoring device includes a trigger interface that is configured to prompt the outputting of a reference signal on different transmit channels of the transmit antenna system, respectively, at different time points.

The high-frequency monitoring device also includes a measuring device and/or a measuring interface assigned to the transmit channels, which may communicate with such measuring devices, to detect reference measurement signals. The reference measurement signals are induced in the respective transmit channel by the reference transmit signal output, respectively, on another of the transmit channels.

The high-frequency monitoring device includes a phase deviation monitoring unit configured to determine a phase deviation indicator value based on the reference measurement signals. The phase deviation indicator value indicates a relative phase deviation between the measuring devices between the transmit devices in question.

Such a phase deviation monitoring unit may also be structured as a standalone component to retrofit an existing high-frequency monitoring device, so that the high-frequency monitoring device may operate according to the present embodiments.

Such a phase deviation monitoring unit includes a suitable interface for detecting the reference measurement signals and/or reference values based thereon. The reference measurement signals are the signals measured by the abovementioned measuring devices (e.g., assigned to the respective transmit channels) that have been induced by a reference transmit signal output at different time points on another of the transmit channels, respectively. The reference values may be, for example, reference measurement signals further processed in a suitable manner that have already been correlated appropriately with one another (or with a reference amplitude and/or reference phase value, for example, in the form of a complex number that represents the amplitude and phase) or the like. A typical example of such reference values may be the matrix elements of a scatter matrix that is described in more detail below.

This phase deviation monitoring unit is configured so that the phase deviation monitoring unit determines a phase deviation indicator value based on the reference measurement signals (e.g., directly or indirectly with the aid of the reference values based on the reference measurement signals). The phase deviation indicator value indicates a relative phase deviation between the measuring devices of the transmit channels in question.

One embodiment of a high-frequency transmit device may be structured in the usual manner, for example, with a plurality of high-frequency power amplifiers that accept high-frequency pulses generated, respectively, by a pulse generation system and amplify the high-frequency pulses to the required power, as well as corresponding lines to the individual transmit channels of the transmit antenna system. The high-frequency transmit device also has the high-frequency monitoring device described above.

In addition to the other standard components, such as a basic field magnet, a gradient magnet system with a plurality of individual gradient coils and, in some embodiments, additional high-frequency receive devices with suitable antennas, one embodiment of a magnetic resonance tomography system also has one embodiment of a high-frequency transmit device with a transmit antenna system having a plurality of transmit channels and such a high-frequency monitoring device.

The high-frequency transmit device and, for example, the high-frequency monitoring device may also be implemented at least partially in the form of software modules on suitable computer units. This applies, for example, to components that further process the measured signals and, optionally, those that have been preprocessed in an analog manner and digitized.

This applies, for example, to the phase deviation monitoring unit that may be implemented entirely or partially in the form of software on a suitable computer unit. One or more of the present embodiments are also achieved by a computer program that may be loaded directly into a memory of a high-frequency transmit device (e.g., a high-frequency monitoring device) of a magnetic resonance tomography system, with suitable program code segments, in order to execute all acts of the method when the program is run in the high-frequency transmit device. Execution of the acts may be that the hardware components used for this purpose are activated in the appropriate manner so that the desired measurements for receiving the signals for further processing (e.g., emission of the reference transmit signal and measurement of the reference measurement signals) are performed in the desired manner.

The description that follows includes advantageous embodiments and developments. The description of one category may also advantageously be developed in the same manner as the description of a different category. Features cited in relation to certain exemplary embodiments may also be combined again in a different manner with different features to achieve further exemplary embodiments.

Intervention may take place with the high-frequency transmit device as soon as just one minor phase deviation is detected. Minor deviations may not be excluded if the minor deviations may normally be tolerated, as the influence of the deviations on further monitoring behavior or monitoring reliability is not of relevance. In order to avoid unnecessary interference when monitoring the high-frequency transmit device and during the overall measuring operation, the phase deviation indicator may therefore be compared with a phase tolerance value. The phase deviation monitoring unit may have a limit value monitoring unit or is coupled to such, and this determines the deviation of the phase deviation indicator value from the predetermined phase tolerance value.

Control of the high-frequency transmit device may also take place taking into account this comparison. For example, the execution of an ongoing or pending magnetic resonance measurement may only be stopped (e.g., the measurement is aborted or prevented) if the predetermined phase tolerance value is exceeded.

Alternatively, a control parameter for a magnetic resonance measurement may be corrected when a predetermined phase tolerance value is exceeded based on a measured phase deviation. Stopping a measurement may be the safest way and may be the method of choice when there is any doubt. In instances where it is absolutely clear that a certain constant error of a measuring device is producing the phase deviation, a control parameter that is ultimately based on measurement signals from the measuring device may be corrected again, as if the measuring device had measured correctly, and the phase deviation were not present.

The phase tolerance value may be a set absolute value. The smaller the reference measurement signal or, in some instances, even the reference transmit signal, the less significant the phase deviation is (e.g., for compliance with the SAR limit values). The phase tolerance value may therefore be predetermined as a function of a high-frequency voltage amplitude of the reference measurement signal and/or the reference transmit signal. For example, the phase tolerance value may thus be increased for low high-frequency voltage amplitudes (e.g., a somewhat larger phase deviation is then permissible than with very high reference measurement signals or reference transmit signals).

Any signal may be used as the reference transmit signal. A high-frequency amplitude (e.g., a maximum high-frequency amplitude) of the reference transmit signal may be selected so that the high-frequency amplitude exceeds a certain test limit value. This test limit value is set, for example, so that it is provided that sufficiently large reference measurement signals may be measured on the other channels. In one embodiment, the reference transmit signal may be defined so that a high-frequency transmit signal corresponds to magnetic resonance measurement to be performed later. This provides that the test or monitoring is suitable for the respective subsequent measurement. In one embodiment, a high-frequency pulse may be selected from the pulse sequence to be emitted during the magnetic resonance measurement (e.g., a high-frequency pulse with a maximum height within the pulse sequence).

The phase deviation indicator value may be determined based on a scatter parameter matrix. The scatter parameter matrix is determined beforehand on the basis of the reference measurement signals. Such a scatter parameter matrix is measured as part of the monitoring method, as described in DE 10 2008 063 630 B4, and used for further monitoring. The method therefore has the advantage that the measurements performed may be used immediately to determine the scatter parameter matrix, and no additional measuring routines are used beyond the standard monitoring method.

Corresponding adjustments to the measurement of the scatter parameter matrix are performed for the known monitoring method if certain conditions change (e.g., there is a change of patient), the prone position is changed, the coils used for measurement are changed, or another excitation mode (e.g., when switching from circular to elliptical polarization, or vice versa) is used. In any instance when a new scatter parameter matrix is supplied, and the corresponding measurements are determined with the aid of the reference transmit signals and other reference measurement signals, the phase deviation indicator value may also be determined in a simple manner as part of the method. In one embodiment, according to DE 10 2008 063 630 B4, for example, the reference scatter parameter matrix, which is measured without load, and/or the object-specific scatter parameter matrix, which is measured with the examination object in the device, may be used.

Measurement may take place with the aid of a directional coupler that detects both a returning wave (e.g., an electromagnetic wave reflected or received from the antenna system) and an arriving wave (e.g., to the antenna system) on the respective channel. The complex voltage amplitudes measured in both directions (e.g., voltage amplitudes that are linked to phase information, the voltage amplitude and the phase information being encoded together with the aid of a complex number) are transferred to a measuring receiver of the respective measuring device. The measuring receiver further processes the values in a suitable form. For example, the measuring receivers may process measurement values in the arriving direction and the returning direction on the transmit channel so that the high-frequency signals are converted to a baseband that lies, for example, in a frequency range around 0 Hz and has a bandwidth of 10 MHz. This conversion to the baseband allows simpler conversion of the voltage amplitudes to digital form. Suitable digitization may take place directly in the high-frequency range of the measured complex voltage amplitudes. DE 10 2008 063 630 B4, which is hereby incorporated by reference in its entirety, illustrates how a scatter parameter matrix may be determined based on a reference transmit signal and a measurement of the subsequent reference measurement signals, so reference may be made to this document for this purpose.

Instead of the scatter parameter matrix, an impedance matrix, conductance matrix, K matrix, etc. may alternatively be used, as these may be converted to a scatter parameter matrix. One advantage of the scatter parameter matrix is, however, that the scatter parameter matrix is a reciprocal matrix for when a reciprocal network is present, which is typically the case with a passive network such as the antenna of a standard high-frequency transmit device of a magnetic resonance tomography system. In this instance, a matrix element of the scatter parameter matrix may be compared simply with a matrix element of the scatter parameter matrix disposed symmetrically in relation to a main diagonal of the scatter parameter matrix. In one embodiment, based on this comparison, a phase deviation indicator value may be determined for the respective channels, to which the matrix elements are assigned.

The matrix elements of such a scatter parameter matrix are complex numerical values that include the scatter amplitude and the scatter phase. A comparison of the matrix elements of the scatter parameter matrix may therefore take place in different ways. In one variant, the complex values of the matrix elements may be compared with one another. In one embodiment, the amounts of the complex values of the matrix elements may be compared. A phase displacement also affects these amounts, so such a comparison is highly suitable for detecting a phase displacement. In one variant, just a comparison of the phase angles of the values of the matrix elements may also take place. In all instances, the comparison may be performed, for example, by a subtraction. If a value greater than 0 is obtained, a phase displacement is present. Alternatively, the respective values may be divided by one another. A phase displacement is indicated by a deviation from the value 1. With the aid of the determination based on a difference or a division, therefore, simple phase indicator deviation indicator values are obtained. The phase indicator deviation indicator values may be evaluated particularly simply (e.g., digitally). One embodiment of the monitoring method according may therefore be particularly simplified.

As mentioned above, the monitoring method may be repeated at recurring intervals. These intervals may be based on one or more rules. In other words, the monitoring method may be executed based on rules. These may be, for example, temporal rules, rules relating to the high-frequency voltage amplitudes used or rules with respect to a change of patient, prone position, antennas used for the magnetic resonance measurement, excitation mode, etc., as described above. The high-frequency monitoring device may thus have a monitoring trigger interface or the like, which starts repetitions of the monitoring method according to the defined rules.

DETAILED DESCRIPTION

Figure 1:
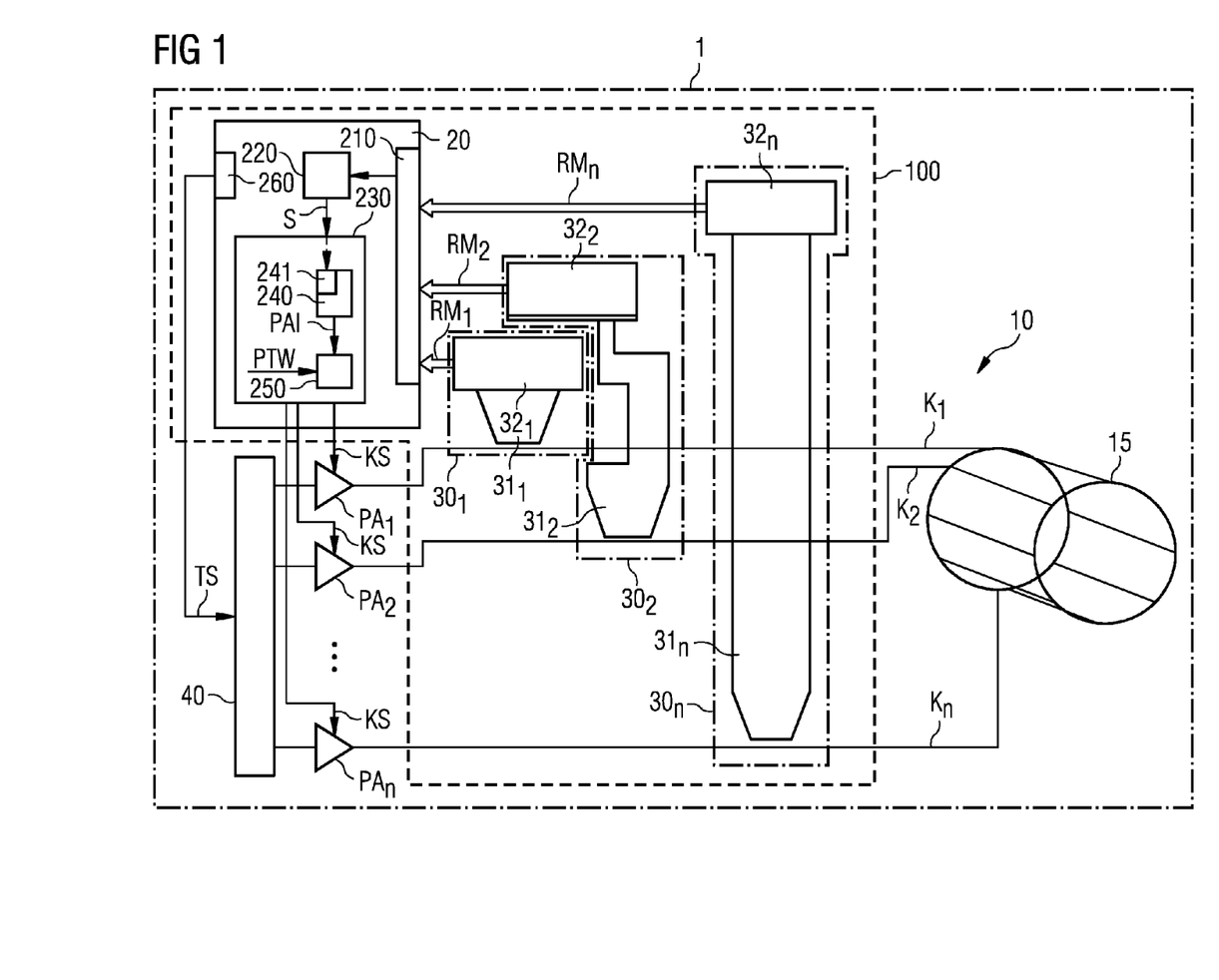
FIG. 1 shows a part of a magnetic resonance tomography system with an exemplary embodiment of a high-frequency transmit device.

One embodiment of a magnetic resonance tomography system 1 includes a scanner that may be used to perform an actual magnetic resonance measurement, and an associated control device that activates the components of the scanner. The scanner has a measuring space (e.g., the patient tunnel), in which a patient or examination object may be positioned on a patient couch. A transmit antenna system 15, for example, of the scanner may include a whole body coil 15 with a plurality of separately activatable transmit channels in order to be able to configure an almost arbitrary transmit field distribution in the measuring space. This whole body coil 15 is illustrated in FIG. 1. FIG. 1 shows a birdcage coil that has a plurality of (e.g., eight) independently activatable conductor rods that are disposed parallel to one another on a cylindrical surface around the measuring space and coupled to one another. The present embodiments, however, are not restricted to such transmit antenna systems. For example, the transmit antenna system may not be formed by a whole body coil. The transmit antenna system may also include a plurality of local coils instead. For example, the transmit antenna system may be a head coil or the like having different transmit channels.

The scanner may also have a magnet system with a basic field magnet in order to apply the desired powerful basic magnetic field in the measuring space, as well as a plurality of gradient coils of a gradient magnet system in order to apply the desired magnetic field gradients, respectively, in the three spatial directions. However, these components are not shown in FIG. 1 for greater clarity.

The scanner is controlled by a system controller that may be connected to a terminal or the like, via which the entire magnetic resonance tomography system 1 may be operated by an operator. Of this system controller, only the high-frequency transmit device 10 and a high-frequency monitoring device 100 are shown. The appropriate high-frequency pulse sequences for a magnetic resonance measurement are generated via this high-frequency transmit device 10. This takes place in a pulse generation system 40, in which, for example, digital high-frequency pulse sequences for the different channels are generated first. The digital high-frequency pulse sequence are then converted to analog separate signals and are fed into the individual transmit channels. These separate signals are then amplified by suitable high-frequency power amplifiers $PA_1, PA_2, \ldots, PA_n$ in order to feed the separate signals into the individual antenna rods of the whole body coil 15, as shown in FIG. 1.

Further components of the system controller include a suitable high-frequency receive device that is used to detect and further process high-frequency signals (e.g., the magnetic resonance signals produced within the examination object during a measurement). Such measurement of the high-frequency resonance signals may take place, for example, with the aid of the whole body coil 15, with the transmit channels $K_1, K_2, \ldots, K_n$ then respectively having switching devices in order to be able to switch from a transmit mode to a receive mode. Alternatively or additionally, separate receive antennas (e.g., local coils) that may then be used to receive the magnetic resonance signals and transfer the magnetic resonance signals to the receive device of the control device may also be provided.

A reconstruction may also generally be present in the control device to further process the received magnetic resonance signals (raw data) in the usual manner and to reconstruct the desired images therefrom.

Such a magnetic resonance tomography system 1 (e.g., the system controller) may also have a plurality of further components (e.g., interfaces for connection to a network) in order to transfer the generated images to other stations, etc. As the basic structure of magnetic resonance tomography systems is, however, known to the person skilled in the art, these components are not shown in FIG. 1 or further explained for reasons of clarity.

For the high-frequency monitoring device 100, which is ultimately intended to monitor the high-frequency transmit device 10 to provide that power limit values are not exceeded at certain points by the power of the emitted high-frequency signals during a measurement and their overlaying within the measuring space, directional couplers $31_1, 31_2, \ldots, 31_n$ are disposed respectively in the supply lines from the individual transmit channels $K_1, K_2, \ldots, K_n$ to the transmit antenna system 15. These directional couplers $31_1, 31_2, \ldots, 31_n$ together with the associated measuring receivers $32_1, 32_2, \ldots, 32_n$ respectively form a suitable measuring device $30_1, 30_2, \ldots, 30_n$, to measure the complex amplitudes (e.g., amplitude and phase, as mentioned above) of the arriving and returning waves in the transmit channels $K_1, K_2, \ldots, K_n$ for each transmit channel $K_1, K_2, \ldots, K_n$. The measured reference measurement signals $RM_1, RM_2, \ldots, RM_n$ are transferred to a control computer 20, which evaluates the signals accordingly.

The control computer 20 may be, for example, a microcontroller or a software module within the control device of the magnetic resonance tomography system 1. The control computer 20 accepts the reference measurement signals $RM_1, RM_2, \ldots, RM_n$ from the measuring devices $30_1, 30_2, 30_N$, respectively, via a measuring interface 210 and processes the reference measurement signals $RM_1, RM_2, \ldots, RM_n$ further. The reference measurement signals $RM_1, RM_2, \ldots, RM_n$ are, for example, first used in a scatter parameter matrix determination unit 220 to generate a scatter parameter matrix S. Electrical networks with a total n connectors may be described by generally complex scatter parameter matrices S as follows:

$$S = \begin{pmatrix} S_{11} & S_{12} & \ldots & S_{1n} \\ S_{21} & S_{22} & \ldots & \ldots \\ \ldots & \ldots & \ldots & \ldots \\ S_{n1} & \ldots & \ldots & S_{nn} \end{pmatrix}$$

Such a scatter parameter matrix may be determined, as mentioned above, by emitting a reference transmit signal RS, one after the other, on the individual transmit channels $K_1, K_2, \ldots, K_n$ and, at the same time, measuring the voltages of the induced forward and backward signals on the respectively other channels $K_1, K_2, \ldots, K_n$, by which the reference signal RS is not emitted at the time.

The signals thus measured are referred to as reference measurement signals $RM_1, RM_2, \ldots, RM_n$.

Figure 2:
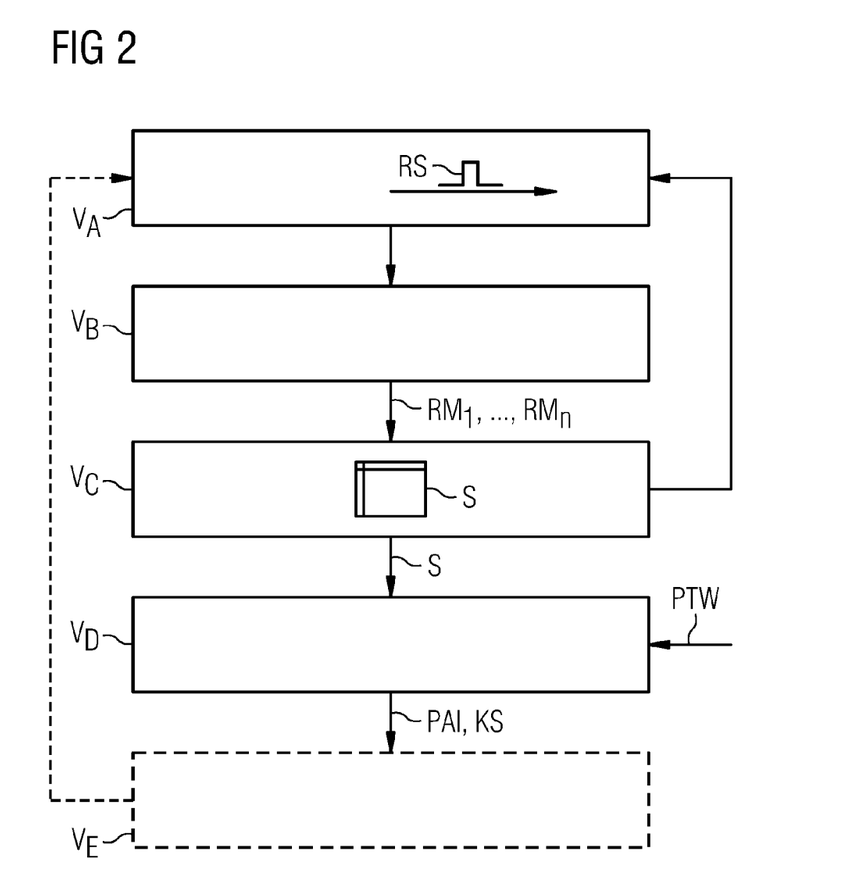
FIG. 2 shows a simplified flow diagram of an exemplary embodiment of a method.

This is illustrated again in FIG. 2 in the form of a flow diagram. In act $V_A$, a reference transmit signal RS is emitted on a first of the channels $K_1, K_2, \ldots, K_n$. In act $V_B$, measurement takes place on the respectively other channels $K_1, K_2, \ldots, K_n$. The complex voltage amplitude of the reference transmit signal RS as the reference measurement signal $RM_1, RM_2, \ldots, RM_n$ is also measured at virtually the same time as the induced reference measurement signals $RM_1, RM_2, \ldots, RM_n$ on the other channels $K_1, K_2, \ldots, K_n$. This provides that the induced reference measurement signals $RM_1, RM_2, \ldots, RM_n$ on the non-transmitting channels $K_1, K_2, \ldots, K_n$ arrive later, but the delay times to or in the channels $K_1, K_2, \ldots, K_n$ are much shorter than the length of the induced reference measurement signals $RM_1, RM_2, \ldots, RM_n$ or the transmitted reference transmit signal RS. This makes measurement over the time range in question in principle static (i.e., virtually simultaneous). The reference measurement signals $RM_1, RM_2, \ldots, RM_n$ determined here are collected in act $V_C$, and as far as possible, the scatter parameter matrix S or individual matrix elements of the scatter parameter matrix S is/are determined, for example, with the available reference measurement signals $RM_1, RM_2, \ldots, RM_n$. The method acts $V_A, V_B, V_C$ are gradually repeated for all transmit channels $K_1, K_2, \ldots, K_n$. In other words, a reference transmit signal RS is emitted one after the other on each of the channels $K_1, K_2, \ldots, K_n$, with the same reference transmit signal RS (e.g., a simple square-wave signal), for example, always being used. The scatter parameter matrix determination unit 220 may thus provide, for example, via a trigger interface 260 (see FIG. 1) that the pulse generation system 40 is prompted by a trigger signal TS to emit the desired reference transmit signal RS on the respective transmit channel $K_1, K_2, \ldots, K_n$.

Calculation of the scatter parameter matrix S is described in the following, where how a scatter parameter matrix may be determined from the arriving and returning wave variables or complex voltage amplitudes is explained.

The elements of the scatter parameter matrix S link the wave variables $a_1, \ldots, a_i, \ldots, a_k, \ldots, a_n$ arriving within a channel $K_1, K_2, \ldots, K_n$ to the wave variables $b_1, \ldots, b_i, \ldots, b_k, \ldots, b_n$ returning in the channels $K_1, K_2, \ldots, K_n$. The arriving wave variables $a_1, \ldots, a_i, \ldots, a_k, \ldots, a_n$ are, for example, elements of vector A, and the returning wave variables $b_1, \ldots, b_i, \ldots, b_k, \ldots, b_n$ are elements of vector B, for which the following applies:

$$B = S \cdot A \quad (1)$$

This gives the individual scatter parameters $s_{ij}$ and $s_{ik}$ (e.g., the matrix elements of the scatter parameter matrix S) for example, as follows:

$$s_{ii} = \frac{b_i}{a_i} \text{ and } s_{ik} = \frac{b_i}{a_k} \quad (2)$$

In order to determine the scatter parameter matrix S with the aid of a measurement, the HF reference transmit signal RS is sent, one after the other, on each of the individual channels $K_1, K_2, \ldots, K_n$, and in the process, the complex voltage amplitudes $U_{arr}, U_{ret}$ of the arriving and returning HF waves are measured separately on each of the channels $K_1, K_2, \ldots, K_n$.

The arriving HF wave variable $a_i$ is obtained from the complex measured amplitude $U_{arr}$, as follows:

$$a_i = \frac{1}{\sqrt{Z_0}} \cdot U_{arr} \quad (3)$$

$Z_0$ is a reference or matching impedance of the respective channel $K_1, K_2, \ldots, K_n$ (i.e., an alternating current impedance) that may be, for example, 50Ω. The returning HF wave $b_i$ is obtained from the complex measured amplitude $U_{ret}$, as follows:

$$b_i = \frac{1}{\sqrt{Z_0}} \cdot U_{ret} \quad (4)$$

The elements of the vectors A and B may thus be calculated from the reference measurement signals $RM_1, RM_2, \ldots, RM_n$, and the scatter parameter matrix S may therefore be calculated using suitable matrix operations.

In this process, one or more of the other channels $K_1, K_2, \ldots, K_n$ may be closed for receiving (e.g., with a suitable switchable impedance) during measuring to determine the scatter parameter matrix S. This allows simple calculation of the scatter parameter matrix S.

All the other channels $K_1, K_2, \ldots, K_n$ may be ready to receive during emission of the reference transmit signal RS, and a reference measurement signal $RM_1, RM_2, \ldots, RM_n$ is detected in each of the channels $K_1, K_2, \ldots, K_n$, respectively, so there is no need for an additional switching device (e.g., the switchable impedance) to close off the channels $K_1, K_2, \ldots, K_n$. A solution to the matrix problem that is a bit more difficult to perform may thus only be calculated to determine the scatter parameter matrix S.

The scatter parameter matrix S may be transferred, as illustrated in FIG. 1, for example, to a calculation unit 230 that determines control signals KS for monitoring the high-frequency transmit device 10 based on the scatter parameter matrix S, and activates the high-frequency power amplifiers $PA_1, PA_2, \ldots, PA_n$, for example, via the control signal KS. The calculation unit 230 may, for example, reduce or completely suppresses the power of the high-frequency power amplifiers $PA_1, PA_2, \ldots, PA_n$ if there is a risk of certain limit values being exceeded. The mode of operation of this calculation unit 230 is also described in DE 10 2008 063 630 B4.

In one embodiment, a phase deviation indicator value PAI is produced based on the reference measurement signals $RM_1, RM_2, \ldots, RM_n$ or, indirectly, based on the reference measurement signals $RM_1, RM_2, \ldots, RM_n$ (e.g., based on the scatter parameter matrix S produced therefrom). This takes place in act $Y_D$. The calculation unit 230 also has a phase deviation monitoring unit 240 that may accept the scatter parameter matrix S via a corresponding interface 241. The phase deviation monitoring unit 240 with the interface 241, like the calculation unit 230 as a whole and the scatter parameter matrix determination unit 220, may be implemented in the form of software on a control computer.

The phase deviation monitoring unit 240 determines, based on the scatter parameter matrix S, whether a phase deviation is present between a measuring device $30_1, 30_2, \ldots, 30_n$ of one transmit channel $K_1, K_2, \ldots, K_n$ and a measuring device $30_1, 30_2, \ldots, 30_n$ of another transmit channel $K_1, K_2, \ldots, K_n$ (e.g., a measuring facility). Use is made of the fact that reciprocal networks, such as the illustrated body coil 15, have the property that the matrix elements of the scatter parameter matrix are identical symmetrically to the main diagonal (i.e., in normal conditions, $S_{ij}=S_{ji}$ for all i, j=1, ..., n applies for the elements of the matrix S shown above (where n is the number of measuring devices or number of transmit channels)). In other words, the scatter parameter matrix is symmetrical. This also provides that the scatter parameter matrix S is also identical to the transposed matrix $S^T$. This property of reciprocity of the scatter parameter matrix S may advantageously be used to check the long-term stability of the measuring devices.

The identicalness of the matrix elements lying symmetrically to the main diagonal is checked. If in the simplest instance, for example, a transmit antenna system with just two transmit channels is checked, whether the matrix element $S_{12}$ is identical to the matrix element $S_{21}$ is monitored. In the case of a four-channel high-frequency transmit device, $S_{12}$ is checked against $S_{21}$, $S_{13}$ is checked against $S_{31}$, $S_{23}$ is checked against $S_{32}$, $S_{14}$ is checked against $S_{41}$, $S_{24}$ is checked against $S_{42}$ and $S_{34}$ is checked against $S_{43}$.

The identicalness check may take place in different ways.

The identicalness of the complete vectors of the complex values of the matrix elements may be checked. For example, whether the vectorial difference between the matrix elements $S_{ij}$ and $S_{ji}$ is smaller in each instance than a defined limit value may be checked.

Alternatively, a check may also simply be performed on the identicalness of the amounts of the complex matrix elements $S_{ij}$ and $S_{ji}$.

Similarly, however, a check may also be performed on the identicalness of the phase angles of the matrix elements $S_{ij}$ and $S_{ji}$.

To check identicalness, the abovementioned values (e.g., the vectors, amounts or even phase angles) may be subtracted from one another.

Alternatively, the abovementioned values may also be divided by one another for comparison.

The difference between or quotient of the matrix elements $S_{ij}$ and $S_{ji}$ is, for example, the phase deviation indicator value PAI. When the difference is formed, a phase deviation indicator value PAI of 0 or in the region of 0, therefore, may result when no phase deviation is present, and when the quotient is formed, a phase deviation indicator value PAI of 1 or in the region of 1 may result.

This phase deviation indicator value PAI may be compared in each instance with a limit value (e.g., the phase tolerance value PTW). The comparison with such a limit value or phase tolerance value PTW may also take place, for example, in method act $Y_D$. The limit value PTW is predetermined externally.

This is also illustrated by way of example in FIG. 1. The phase tolerance value PTW may be stored permanently, for example, in a memory or may be predetermined automatically by a calculation rule. The limit value or phase tolerance value PTW may also be selected as a function of the expected measurement voltages at the measuring devices, with certain rules being predetermined. The expected measurement voltages may be derived or determined, for example, from a control protocol for a magnetic resonance examination to be performed later. Thus, with low amplitudes of the reference measurement signals $RM_1$, $RM_2$, ..., $RM_n$ (e.g., the measurement voltages at the measuring devices), the phase tolerance value PTW may be increased slightly in order to take into account the measurement errors that increase with decreasing amplitude in some instances due to the limited dynamic range of the measuring devices $30_1$, $30_2$, ..., $30_n$. This is possible, as with decreasing power (which results in the decreasing measurement voltages), the risk to the patient is also continuously reduced, and therefore, greater tolerance values are permissible.

According to the exemplary embodiment in FIG. 1, the comparison of the determined phase deviation indicator value PAI with the phase tolerance value PTW takes place in a separate limit value monitoring unit 250. The limit value monitoring unit 250 then, for example, outputs a corresponding alarm value when the phase tolerance value PTW is exceeded by the phase deviation indicator value PAI. This signal is further processed by the control computer 20 or the calculation unit 230 or causes corresponding control signals KS to be output to the power amplifiers $PA_1$, $PA_2$, ..., $PA_n$. In an extreme instance, the control signals KS simply interrupt the ongoing measurement or prevent a further measurement being performed until the error has been eliminated. At the same time, a corresponding alarm signal may be output to the operator so that said operator is informed of the error. The phase deviation monitoring unit 240 and the limit value monitoring unit 250 may also be configured as a common unit.

In a further method step $Y_E$, such intervention in ongoing measurements is shown as an optional method block. Similarly, a broken arrow on the left pointing up to method step $V_A$ indicates symbolically that monitoring takes place at temporally recurring intervals or is repeated for certain events, for example when a new, different patient or a new, different body part is to be imaged, or the antennas or transmit mode is/are changed, etc.

As the above exemplary embodiment shows, the embodiments offer a simple way of also checking the safety-related measuring devices of the high-frequency transmit device without major outlay with respect to phase displacement at sufficiently time short intervals, thereby further improving safety with respect to monitoring the high-frequency transmit device.

The above method, as described in detail, and the illustrated high-frequency transmit device or the high-frequency monitoring device are exemplary embodiments that may be modified by the person skilled in the art in a wide variety of ways without departing from the scope of the invention. Although the present embodiments were described above with reference to a magnetic resonance tomography system in the medical field, the present embodiments may also be used in magnetic resonance tomography systems used in science and/or industry. The use of the indefinite article "a" does not provide that the features in question may not be present in a multiple manner. Likewise, the terms "unit" or "module" do not provide that these may not include a number of components, which may in some instances also be spatially distributed.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring a high-frequency transmit device of a magnetic resonance tomography system with a transmit antenna system having a plurality of transmit channels, the method comprising:
   outputting a reference transmit signal on different transmit channels of the transmit antenna system, respectively, at different time points, measuring devices being assigned to respective transmit channels;
   measuring a reference measurement signal induced by the reference transmit signal on at least one of the other transmit channels using the measuring device assigned to the transmit channel; and
   determining a phase deviation indicator value based on the reference measurement signal, the phase deviation indicator value indicating a relative phase deviation between the measuring devices of at least some of the transmit channels.

2. The method of claim 1, further comprising:
   comparing the phase deviation indicator value with a phase tolerance value; and
   controlling the high-frequency transmit taking into account the comparison.

3. The method of claim 2, further comprising:
   stopping execution of a magnetic resonance measurement when the phase tolerance value is exceeded; or
   correcting a control parameter for the magnetic resonance measurement based on a measured phase deviation when the phase tolerance value is exceeded.

4. The method of claim 3, further comprising predetermining the phase tolerance value as a function of a high-frequency voltage amplitude of the reference measurement signal, the reference transmit signal, or the reference measurement signal and the reference transmit signal.

5. The method of claim 3, further comprising selecting a high-frequency amplitude of the reference transmit signal so that the selected high-frequency amplitude of the reference transmit signal exceeds a test limit value.

6. The method of claim 3, further comprising defining the reference transmit signal so that the reference transmit signal corresponds to a transmit signal of a magnetic resonance measurement to be performed later.

7. The method of claim 3, further comprising determining the phase deviation indicator value based on a scatter parameter matrix.

8. The method of claim 7, further comprising:
   comparing a matrix element of the scatter parameter matrix with a matrix element of the scatter parameter matrix disposed symmetrically in relation to a main diagonal of the scatter parameter matrix; and
   determining the phase deviation indicator value based on the comparison.

9. The method of claim 2, further comprising predetermining the phase tolerance value as a function of a high-frequency voltage amplitude of the reference measurement signal, the reference transmit signal, or the reference measurement signal and the reference transmit signal.

10. The method of claim 1, further comprising selecting a high-frequency amplitude of the reference transmit signal so that the selected high-frequency amplitude of the reference transmit signal exceeds a test limit value.

11. The method of claim 1, further comprising defining the reference transmit signal so that the reference transmit signal corresponds to a transmit signal of a magnetic resonance measurement to be performed later.

12. The method of claim 1, further comprising determining the phase deviation indicator value based on a scatter parameter matrix.

13. The method of claim 12, further comprising:
   comparing a matrix element of the scatter parameter matrix with a matrix element of the scatter parameter matrix disposed symmetrically in relation to a main diagonal of the scatter parameter matrix; and
   determining the phase deviation indicator value based on the comparison.

14. The method of claim 13, wherein the comparing comprises comparing complex values of the matrix elements, comparing amounts of values of matrix elements of the scatter parameter matrix, comparing phase angles of the values of the matrix elements, or a combination thereof.

15. The method of claim 1, wherein the monitoring method is repeated at recurring intervals.

16. A phase deviation monitoring unit for a high-frequency monitoring device for a high-frequency transmit device of a magnetic resonance tomography system, the magnetic resonance tomography system comprising a transmit antenna system having a plurality of transmit channels, the phase deviation monitoring unit comprising:
   an interface configured to detect reference measurement signals, reference values based on the reference measurement signals, or the reference measurement signals and the reference values, the reference measurement signals being measurable by measuring devices assigned respectively to the plurality of transmit channels and being inducible by a reference transmit signal output at different time points on a respectively other transmit channel,
   wherein the phase deviation monitoring unit is configured to determine a phase deviation indicator value based on the reference measurement signals, the reference values, or the reference values and the reference measurement signals, the phase deviation indicator indicating a relative phase deviation between the measuring devices of at least some transmit channels of the plurality of transmit channels.

17. A high-frequency monitoring device for a high-frequency transmit device of a magnetic resonance tomography system, the magnetic resonance tomography system comprising a transmit antenna system having a plurality of transmit channels, the high-frequency monitoring device comprising:
   a trigger interface configured to prompt an outputting of a reference transmit signal on different transmit channels of the transmit antenna system, respectively, at different time points;
   measuring devices assigned to the transmit channels, a measuring interface, or the measuring devices and the measuring interface, the measuring devices and the measuring interface being for detecting reference measurement signals that are induced in the respective transmit channel by the reference transmit signal output in each instance on another of the transmit channels; and
   a phase deviation monitoring unit configured to determine a phase deviation indicator value based on the reference measurement signals, the phase deviation indicator value indicating a relative phase deviation between the measuring devices of at least some of the transmit channels.

18. A high-frequency transmit device of a magnetic resonance tomography system, the magnetic resonance tomography system comprising a transmit antenna system having a plurality of transmit channels, the high-frequency transmit device comprising:
- a high-frequency monitoring device comprising:
  - a trigger interface configured to prompt an outputting of a reference transmit signal on different transmit channels of the transmit antenna system, respectively, at different time points;
  - measuring devices assigned to the transmit channels, a measuring interface, or the measuring devices and the measuring interface, the measuring devices and the measuring interface being for detecting reference measurement signals that are induced in the respective transmit channel by the reference transmit signal output in each instance on another of the transmit channels; and
  - a phase deviation monitoring unit configured to determine a phase deviation indicator value based on the reference measurement signals, the phase deviation indicator value indicating a relative phase deviation between the measuring devices of at least some of the transmit channels.

19. A magnetic resonance tomography system comprising:
a transmit antenna system having a plurality of transmit channels;
a high-frequency transmit device comprising:
- a high-frequency monitoring device comprising:
  - a trigger interface configured to prompt an outputting of a reference transmit signal on different transmit channels of the transmit antenna system, respectively, at different time points;
  - measuring devices assigned to the transmit channels, a measuring interface, or the measuring devices and the measuring interface, the measuring devices and the measuring interface being for detecting reference measurement signals that are induced in the respective transmit channel by the reference transmit signal output in each instance on another of the transmit channels; and
  - a phase deviation monitoring unit configured to determine a phase deviation indicator value based on the reference measurement signals, the phase deviation indicator value indicating a relative phase deviation between the measuring devices of at least some of the transmit channels.

20. A non-transitory computer-readable storage medium storing a computer program with program segments executable by a high-frequency transmit device of a magnetic resonance tomography system to monitor the high-frequency transmit device, the magnetic resonance tomography system comprising a transmit antenna system having a plurality of transmit channels, the program segments comprising instructions including:
- outputting a reference transmit signal on different transmit channels of the transmit antenna system, respectively, at different time points, measuring devices assigned to each of the transmit channels;
- measuring a reference measurement signal induced by the reference transmit signal on at least one of the other transmit channels using the measuring device assigned to the transmit channel; and
- determining a phase deviation indicator value based on the reference measurement signal, the phase deviation indicating a relative phase deviation between the measuring devices of at least some of the transmit channels.

* * * * *